United States Patent
Song

(10) Patent No.: US 10,841,655 B2
(45) Date of Patent: Nov. 17, 2020

(54) DATA STORAGE FRAMEWORK AND TELEVISION DEVICE

(71) Applicant: AMLOGIC (SHANGHAI) CO., LTD., Pudong (CN)

(72) Inventor: Wenhua Song, Pudong (CN)

(73) Assignee: AMLOGIC (SHANGHAI) CO., LTD., Pudong (CN)

( * ) Notice: Subject to any disclaimer, the term of this patent is extended or adjusted under 35 U.S.C. 154(b) by 0 days.

(21) Appl. No.: 16/668,406

(22) Filed: Oct. 30, 2019

(65) Prior Publication Data

US 2020/0137346 A1    Apr. 30, 2020

(30) Foreign Application Priority Data

Oct. 31, 2018 (CN) .......................... 2018 1 1289355

(51) Int. Cl.
| | |
|---|---|
| *H04N 21/47* | (2011.01) |
| *H04H 20/28* | (2008.01) |
| *H04N 5/64* | (2006.01) |
| *H04N 7/088* | (2006.01) |
| *H04N 21/431* | (2011.01) |
| *H04N 21/426* | (2011.01) |

(52) U.S. Cl.
CPC ............ *H04N 21/47* (2013.01); *H04H 20/28* (2013.01); *H04N 5/64* (2013.01); *H04N 7/0887* (2013.01); *H04N 21/426* (2013.01); *H04N 21/4316* (2013.01)

(58) Field of Classification Search
CPC ........... H04N 21/4316; H04N 21/4143; H04N 21/234363; H04N 21/2358; H04N 21/25825
See application file for complete search history.

(56) References Cited

U.S. PATENT DOCUMENTS

2016/0100121 A1* 4/2016 Shintani ................... H04N 5/45
348/565

FOREIGN PATENT DOCUMENTS

| CN | 102073455 A | 5/2011 |
|---|---|---|
| CN | 103957454 A | 7/2014 |

\* cited by examiner

*Primary Examiner* — Samira Monshi
(74) *Attorney, Agent, or Firm* — Umberg Zipser LLP

(57) ABSTRACT

The invention relates to the technical field of television, and more particularly, to a data storage framework and a television device. The television device comprises a main screen and a plurality of sub-screens. The data storage framework comprises: a processor; a basic database, and a differential database, wherein the basic database is configured to store configuration data items of the main screen; the differential database is configured to store configuration data items of the plurality of sub-screens different from those of the main screen; wherein the processor is connected to the basic database and the differential database, respectively; and during display configuration of the plurality of sub-screens, the processor combines the basic database and the differential database to form a synthetic database, and outputs the synthetic database to the plurality of sub-screens. Thus, the storage data are optimized; the storage space is saved; and lower cost is realized.

5 Claims, 1 Drawing Sheet

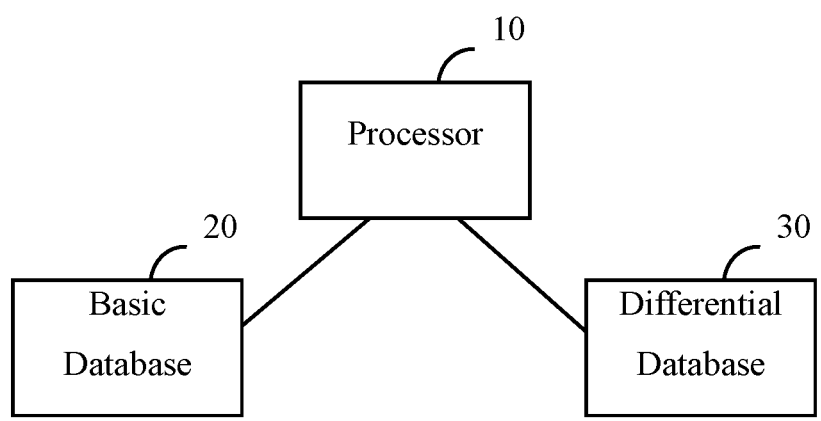

DATA STORAGE FRAMEWORK AND TELEVISION DEVICE

CROSS-REFERENCE TO RELATED APPLICATIONS

The present application claims priority to and the benefit of Chinese Patent Application No. CN 201811289355.1 filed on Oct. 31, 2018, the entire content of which is incorporated herein by reference.

BACKGROUND OF THE INVENTION

1. Field of the Invention

The invention relates to the technical field of televisions, and more particularly, to a data storage framework and a television device.

2. Description of the Related Art

A smart television is a television set using the internet technology. Apart from an open operating system and chips, it also has an open application platform, through which two-way human-computer interaction is enabled. With a wide range of functions to choose from, such as audio and video activities, entertainment, and data, personalized and diversified demands for users may be met. The aim of the smart television is to bring convenience to the users, thus, it has emerged as one of the favorite televisions.

Since the smart television is equipped with an operating system, the user is allowed to install and uninstall all types of applications while watching TV programs. The smart television is a new television product that functions are continuously expanded and updated. It may provide a personalized experience for users, and such a personalized experience is not accessible from the traditional cable digital television receiver.

On most occasions, the traditional smart televisions use EMMC (Embedded Multi Media Card) memory chips for reducing costs, having a size of 8G. Of note, most of the space is occupied by other system partitions, and space for storage database is very limited, generally has a size of 32 M. Televisions of the same brand, and mass-production screens of a batch correspond to one database file, and the database file has a size of about 1.6M. Thus, such a hardware configuration may only store 20 screen databases, which limits the shipment. If it is desired to increase the shipments, the partition for storage of the database is required to be increased, and production costs may be increased a lot accordingly.

SUMMARY OF THE INVENTION

Given that the foregoing problems exist in the prior art, the present invention provides a data storage framework, applied to a television device comprising a main screen and a plurality of sub-screens;

wherein the data storage framework comprises:
a processor;
a basic database configured to store configuration data items of the main screen;
a differential database configured to store configuration data items of the plurality of sub-screens different from those of the main screen;
wherein the processor is connected to the basic database and the differential database, respectively;

during display configuration of the plurality of sub-screens, the processor combines the basic database and the differential database to form a synthetic database, and outputs the synthetic database to the plurality of sub-screens.

In the above-mentioned data storage framework, the differential database is obtained by deleting duplicate data items from an original sub-screen database, in which the duplicate data items are reduplicative with respect to the basic database.

In the above-mentioned data storage framework, the basic database comprises data for storing the configuration data items of the main screen; and the original sub-screen database comprises data for storing the configuration data items obtained by differentiate each of the plurality of sub-screens from the main screen database.

In the above-mentioned data storage framework, if data in all fields of two configuration data items are the same, it is determined that the two configuration data items are the duplicate data items.

In the above-mentioned data storage framework, the synthetic database comprises a numeric parameter for representing the number of the configuration data items;

the numeric parameter in the synthetic database is equal to a sum of the number of the configuration data items in the basic database and the number of the configuration data items in the differential database.

A television device applied to any one of the data storage frameworks described above.

In the above-mentioned television device, the differential database is stored in a predetermined system partition of a memory.

In the above-mentioned television device, the television device automatically verifies whether the synthetic database exists in the predetermined system partition each time it is switched on, and if the synthetic database does not exist in the predetermined system partition, combination is made as follows:

the synthetic database comprises a numeric parameter for representing the number of the configuration data items;

the numeric parameter in the synthetic database is equal to a sum of the number of the configuration data items in the basic database and the number of the configuration data items in the differential database.

The present invention has the following advantageous effects:

By using a data storage framework and a television device according to the present invention, the storage data are optimized; the storage space is saved; and lower cost is realized.

BRIEF DESCRIPTION OF THE DRAWINGS

The accompanying drawings, together with the specification, illustrate exemplary embodiments of the present disclosure, and, together with the description, serve to explain the principles of the present invention.

FIG. 1 is a schematic diagram illustrating a structure of a data storage framework according to an embodiment of the present invention.

DETAILED DESCRIPTION

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" means a number greater than one.

Hereinafter, certain exemplary embodiments according to the present disclosure will be described with reference to the accompanying drawings.

Example 1

In a preferred embodiment, as shown in FIG. 1, a data storage framework is provided and applied to a television device, wherein the television device comprises a main screen and a plurality of sub-screens;
wherein the data storage framework may comprise:
a processor 10;
a basic database 20 configured to store configuration data items of the main screen;
a differential database 30 configured to store configuration data items of the plurality of sub-screens different from those of the main screen;
wherein the processor 10 is connected to the basic database 20 and the differential database 30, respectively;
during display configuration of the plurality of sub-screens, the processor 10 combines the basic database 20 and the differential database 30 to form a synthetic database, and outputs the synthetic database to the plurality of sub-screens.
In a preferred embodiment, the differential database 30 is obtained by deleting duplicate data items from an original sub-screen database, in which the duplicate data items are reduplicative with respect to the basic database 20.

In the above-mentioned embodiment, preferably, the basic database 20 comprises data for storing the configuration data items of the main screen; and
the original sub-screen database comprises data for storing the configuration data items obtained by differentiate each of the plurality of sub-screens from the main screen database.

In the above-mentioned technical solution, the arrangement of the same list name and the same data item may facilitate one-to-one search and match of the list, and thus facilitate the production and management of the database.

In the above-mentioned embodiment, preferably, if data in all fields of two configuration data items are the same, it is determined that the two configuration data items are the duplicate data items.

In a preferred embodiment, the synthetic database comprises a numeric parameter for representing the number of the configuration data items;
the numeric parameter in the synthetic database is equal to a sum of the number of the configuration data items in the basic database 20 and the number of the configuration data items in the differential database 30, that is, configuration data in the differential database 30 is updated to the basic database 20, then a new database file corresponding to each of the sub-screens is generated.

In the above-mentioned technical solution, during the process of combining the basic database 20 and the differential database 30, the configuration data items may be sequentially updated to the synthetic database in a preset order, that is, the number of the configuration data items in the synthetic database may not be increased, and the corresponding items are updated into data in the differential database 30 until the data in the differential database 30 is completely updated into the basic database 20. Finally, a new synthetic database is generated, and the process may come to an end.

Example 2

In a preferred embodiment, a television device, applied to any one of the data storage frameworks described above, is provided in the present invention.

In a preferred embodiment, the differential database is stored in a predetermined system partition of a memory, for example, in a predetermined specific client partition.

In the above-mentioned embodiment, preferably, the television device automatically verifies whether the synthetic database of corresponding screens exists in the pre-set system partition each time it is switched on.

In the above-mentioned technical solution, if the synthetic database does exist in the pre-set system partition, the process of creating the synthetic database may be skipped; otherwise, a new synthetic database needs to be created.

Specifically, creating the differential database according to the present invention may comprise the steps of:
1. opening the basic database;
2. adding a newly-added screen database;
3. querying lists in the basic database and data in all the fields of each configuration data item in each of the lists;
4. matching the newly-added screen database with the basic database to find the same configuration data items based on a query result, and deleting the same configuration data items and keeping different configuration data items;
5. checking whether query of all the lists in the basic database is completed;
6. if no, turning to step 3;

7. after the query is finished, clearing free pages in a file of the differential database, and cleaning the file structure of the differential database;

8. accomplishing differential data.

In the present invention, the process for combining the differential database and the basic database may be shown as follows:

1) powering on the television device;

2) determining whether file "pq.db" exists in the system partition userdata;

3) if yes, it means that the differential database corresponding to the current screen has been synthesized, so it does not need to be synthesized again, that it, turning to step 12);

4) if not, copying a backup basic database in the directory system/etc to the directory userdata, and it is named as database "pq.db";

5) opening the differential database file corresponding to the current screen;

6) adding the basic database "pq.db" under the directory userdata;

7) querying lists in the differential database and data in all the fields of each configuration data item in each of the lists;

8) if the corresponding fields is detected, the configuration data items in the differential database is updated to the configuration data items of corresponding lists in the additional database "pq.db";

9) determining whether query of the differential database is completed;

10) if not, turning to 7, and another round of query is started;

11) if yes, the query ends, and the database "pq.db" is separated, and the synthetic database is created;

12) opening the database "pq.db" under the directory userdata for next steps.

In conclusion, the invention provides a data storage framework and a television device. The television device comprises a main screen and a plurality of sub-screens. The data storage framework comprises: a processor; a basic database configured to store configuration data items of the main screen; a differential database configured to store configuration data items of the plurality of sub-screens different from those of the main screen; wherein the processor is connected to the basic database and the differential database, respectively; during display configuration of the plurality of sub-screens, the processor combines the basic database and the differential database to form a synthetic database, and outputs the synthetic database to the plurality of sub-screens. By adopting the technical solutions, the storage data are optimized; the storage space is saved; and lower cost is realized.

The above descriptions are only the preferred embodiments of the invention, not thus limiting the embodiments and scope of the invention. Those skilled in the art should be able to realize that the schemes obtained from the content of specification and drawings of the invention are within the scope of the invention.

What is claimed is:

1. A data storage framework, applied to a television device comprising a main screen and a plurality of sub-screens;
wherein the data storage framework comprises:
a processor;
a basic database configured to store configuration data items of the main screen;
a differential database configured to store configuration data items of the plurality of sub-screens different from those of the main screen;
wherein the processor is connected to the basic database and the differential database, respectively;
during display configuration of the plurality of sub-screens, the processor combines the basic database and the differential database to form a synthetic database, and outputs the synthetic database to the plurality of sub-screens;
wherein the differential database is obtained by deleting duplicate data items from an original sub-screen database, in which the duplicate data items are reduplicative with respect to the basic database.

2. The data storage framework of claim 1, wherein the basic database comprises data for storing the configuration data items of the main screen; and the original sub-screen database comprises data for storing the configuration data items obtained by differentiate each of the plurality of sub-screens from the main screen database.

3. The data storage framework of claim 1, wherein if data in all fields of two configuration data items are the same, it is determined that the two configuration data items are the duplicate data items.

4. The data storage framework of claim 1, wherein the synthetic database comprises a numeric parameter for representing the number of the configuration data items;
the numeric parameter in the synthetic database is equal to a sum of the number of the configuration data items in the basic database and the number of the configuration data items in the differential database.

5. A television device applied to the data storage framework of claim 1, wherein the differential database is stored in a predetermined system partition of a memory, wherein the television device automatically verifies whether the synthetic database exists in the predetermined system partition each time it is switched on, and if the synthetic database does not exist in the predetermined system partition, combination is made as follows:
the synthetic database comprises a numeric parameter for representing the number of the configuration data items;
the numeric parameter in the synthetic database is equal to a sum of the number of the configuration data items in the basic database and the number of the configuration data items in the differential database.

* * * * *